(12) United States Patent
Chen et al.

(10) Patent No.: US 12,484,976 B2
(45) Date of Patent: Dec. 2, 2025

(54) OBJECT TRACKING METHOD, OBJECT TRACKING SYSTEM AND NON-TRANSITORY COMPUTER READABLE STORAGE MEDIUM

(71) Applicant: HTC Corporation, Taoyuan (TW)

(72) Inventors: Yan-Ru Chen, Taoyuan (TW); Heng-Li Hsieh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 146 days.

(21) Appl. No.: 18/536,170

(22) Filed: Dec. 11, 2023

(65) Prior Publication Data

US 2025/0186138 A1 Jun. 12, 2025

(51) Int. Cl.
| | | |
|---|---|---|
| *A61B 34/00* | (2016.01) | |
| *A61B 34/20* | (2016.01) | |
| *G06T 7/70* | (2017.01) | |
| *G06T 11/00* | (2006.01) | |

(52) U.S. Cl.
CPC ............... *A61B 34/25* (2016.02); *G06T 7/70* (2017.01); *G06T 11/00* (2013.01); *A61B 2034/2065* (2016.02); *A61B 2034/2072* (2016.02); *G06T 2207/10048* (2013.01); *G06T 2210/41* (2013.01)

(58) Field of Classification Search
CPC ............ A61B 34/25; A61B 2034/2065; A61B 2034/2072; G06T 7/70; G06T 11/00; G06T 2207/10048; G06T 2210/41; G06T 19/003; G06F 3/012; G06F 3/0346; G06F 3/011
See application file for complete search history.

(56) References Cited

U.S. PATENT DOCUMENTS

| | | | |
|---|---|---|---|
| 10,825,563 B2 | 11/2020 | Gibby et al. | |
| 2009/0143670 A1* | 6/2009 | Daigneault | A61B 34/20 600/424 |
| 2011/0004224 A1* | 1/2011 | Daigneault | A61B 5/06 606/130 |
| 2019/0113966 A1 | 4/2019 | Connellan et al. | |

(Continued)

FOREIGN PATENT DOCUMENTS

| | | | | |
|---|---|---|---|---|
| CN | 117323007 A | * | 1/2024 | A61B 34/20 |
| TW | 201818277 A | | 5/2018 | |

(Continued)

OTHER PUBLICATIONS

The EESR of the corresponding European application No. EP 24177789.5 issued on Nov. 15, 2024.

(Continued)

*Primary Examiner* — George Eng
(74) *Attorney, Agent, or Firm* — CKC & Partners Co., LLC

(57) ABSTRACT

The present disclosure provides object tracking method and system. The object tracking method is applicable to the object tracking system configured to track a target object. The object tracking method includes: by a first tracking equipment, obtaining first spatial relationship information between an electronic device and an anchor object; by a second tracking equipment, obtaining second spatial relationship information between the anchor object and the target object; and by an information processor, calculating spatial information of the target object in relation to the electronic device according to the first spatial relationship information and the second spatial relationship information.

20 Claims, 6 Drawing Sheets

(56) References Cited

U.S. PATENT DOCUMENTS

| | | | |
|---|---|---|---|
| 2021/0287382 A1 | 9/2021 | Lehrich et al. | |
| 2022/0221716 A1 | 7/2022 | Welch et al. | |
| 2022/0317771 A1 | 10/2022 | Chen et al. | |
| 2024/0024036 A1* | 1/2024 | Schipper | A61B 34/35 |
| 2024/0415607 A1* | 12/2024 | Daon | A61B 90/16 |

FOREIGN PATENT DOCUMENTS

| | | |
|---|---|---|
| TW | 201919541 A | 6/2019 |
| TW | 202147255 A | 12/2021 |
| WO | 2023234824 A1 | 12/2023 |

OTHER PUBLICATIONS

The Office Action of the corresponding European application No. EP 24177789.5 issued on Nov. 27, 2024.

The office action of the corresponding Taiwanese application No. TW113113039 issued on Nov. 18, 2024.

The office action of the corresponding Taiwanese application No. TW113113039 issued on Jul. 30, 2024.

\* cited by examiner

OBJECT TRACKING METHOD, OBJECT TRACKING SYSTEM AND NON-TRANSITORY COMPUTER READABLE STORAGE MEDIUM

BACKGROUND

Field of Invention

This disclosure relates to a method and system, in particular to an object tracking method and system.

Description of Related Art

In the fields of object tracking, some related arts may use tracking technologies such as tracker, infrared light emitting diode (LED), optical code (e.g., QR code), etc. However, these related arts may face problems when tracking a tiny (or small) object (e.g., scalpel). For example, most of the trackers are not applicable to the tiny object due to its physical limitation (e.g., weight, size, etc.). The infrared LED and the optical code may be easily occluded or dirtied, so as to become invalid. Some related arts design and create a specific environment for tracking, which may not have wide applicability to all sorts of different places and may cost a fortune. Therefore, it is necessary to provide a new approach to address the above problems.

SUMMARY

An aspect of present disclosure relates to an object tracking method applicable to an object tracking system configured to track a target object. The object tracking method includes: by a first tracking equipment, obtaining first spatial relationship information between an electronic device and an anchor object; by a second tracking equipment, obtaining second spatial relationship information between the anchor object and the target object; and by an information processor, calculating spatial information of the target object in relation to the electronic device according to the first spatial relationship information and the second spatial relationship information.

Another aspect of present disclosure relates to an object tracking system configured to track a target object. The object tracking system includes an electronic device, a first tracking equipment, a second tracking equipment and an information processor. The first tracking equipment is configured to obtain first spatial relationship information between the electronic device and an anchor object. The second tracking equipment is configured to obtain second spatial relationship information between the anchor object and the target object. The information processor is configured to calculate spatial information of the target object in relation to the electronic device according to the first spatial relationship information and the second spatial relationship information.

Another aspect of present disclosure relates to a non-transitory computer readable storage medium with a computer program to execute an object tracking method applicable to an object tracking system configured to track a target object. The object tracking method includes: by a first tracking equipment, obtaining first spatial relationship information between an electronic device and an anchor object; by a second tracking equipment, obtaining second spatial relationship information between the anchor object and the target object; and by an information processor, calculating spatial information of the target object in relation to the electronic device according to the first spatial relationship information and the second spatial relationship information.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

As used herein, "coupled" and "connected" may be used to indicate that two or more elements physical or electrical contact with each other directly or indirectly, and may also be used to indicate that two or more elements cooperate or interact with each other.

Figure 1:
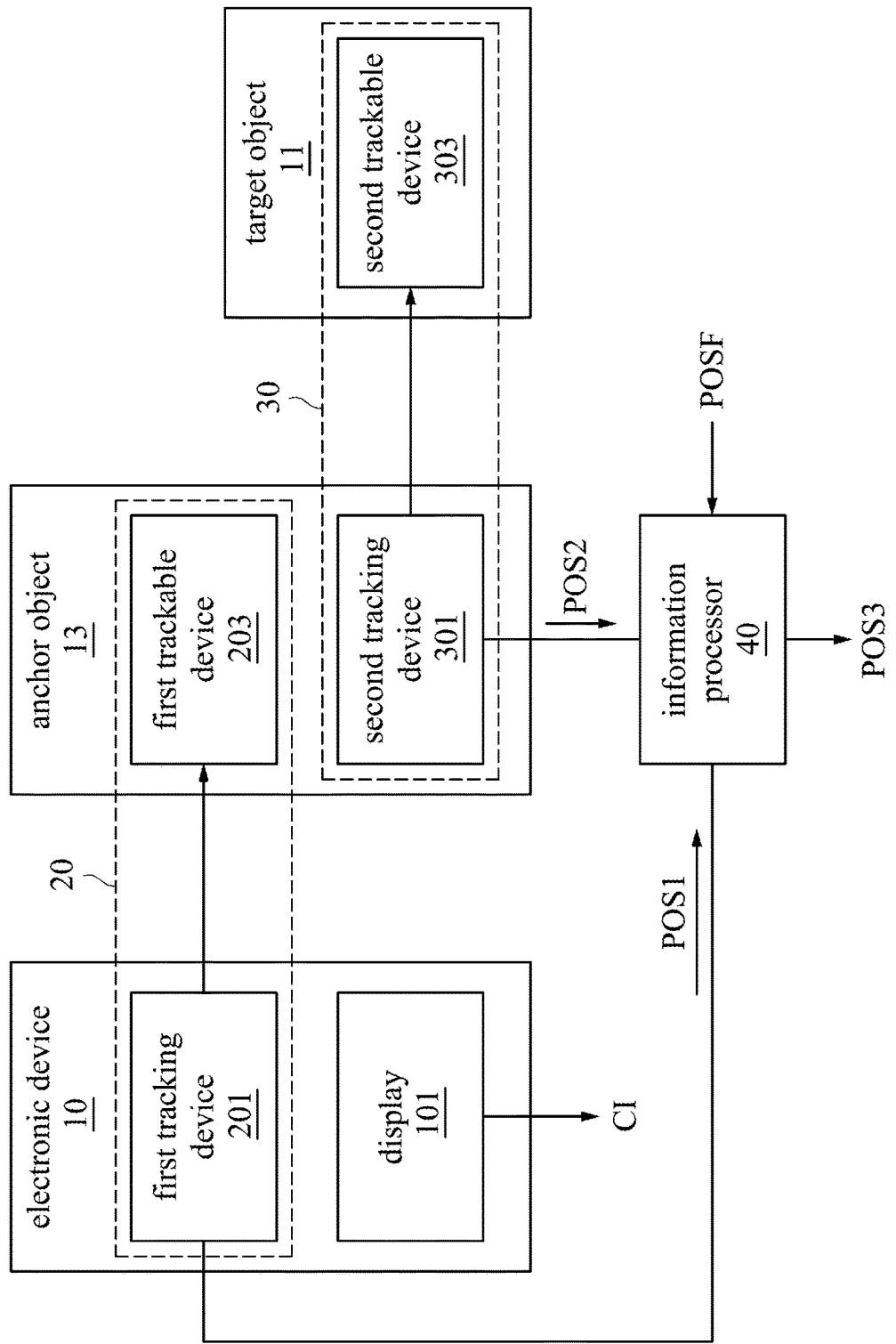
FIG. 1 is a block diagram of an object tracking system in accordance with some embodiments of the present disclosure.

Referring to FIG. 1, FIG. 1 is a block diagram of an object tracking system 100 in accordance with some embodiments of the present disclosure. In some embodiments, the object tracking system 100 includes an electronic device 10, first tracking equipment 20, second tracking equipment 30 and an information processor 40. The object tracking system 100 is configured to track a target object 11 in a real-world environment (not shown in FIG. 1).

In some practical applications, at least the electronic device 10, the first tracking equipment 20 and the second tracking equipment 30 of the object tracking system 100 would be in the real-world environment together with the target object 11. The information processor 40 can be communicatively coupled to the electronic device 10, the first tracking equipment 20 and the second tracking equipment 30. Thus, the information processor 40 can be arranged in the real-world environment or other places. Notably, based on an anchor object 13 determined in the real-world environment, spatial information of the target object 11 in relation to the electronic device 10 can be obtained by operations of the first tracking equipment 20, the second tracking equipment 30 and the information processor 40.

Figure 2:
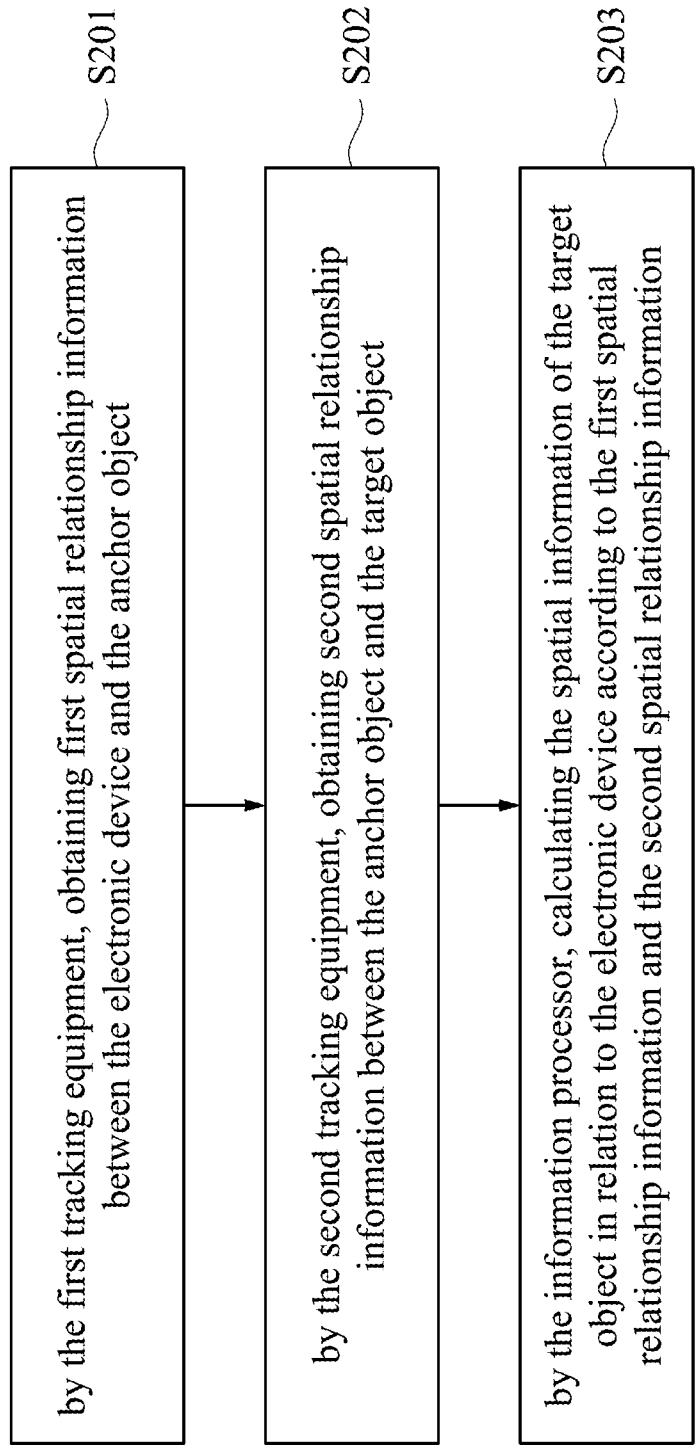
FIG. 2 is a flow diagram of an object tracking method in accordance with some embodiments of the present disclosure.

The operations of the first tracking equipment 20, the second tracking equipment 30 and the information processor 40 would be described in detail below with reference to an object tracking method 200. FIG. 2 is a flow diagram of the object tracking method 200 in accordance with some embodiments of the present disclosure. The object tracking method 200 is applicable to the object tracking system 100 of FIG. 1. In some embodiments, as shown in FIG. 2, the object tracking method 200 includes operations S201-S203.

In operation S201, the first tracking equipment 20 obtains first spatial relationship information between the electronic device 10 and the anchor object 13. In some embodiments, as shown in FIG. 1, the first tracking equipment 20 includes a first tracking device 201 and a first trackable device 203. In particular, the first tracking device 201 is arranged on the electronic device 10, and the first trackable device 203 is arranged on the anchor object 13. In such arrangements, the first tracking equipment 20 is capable of obtaining the first spatial relationship information between the electronic device 10 and the anchor object 13.

According to the embodiments of FIG. 1, the first tracking device 201 on the electronic device 10 can interact with the first trackable device 203 on the anchor object 13, so as to calculate first pose data POS1 of the first trackable device 203 in relation to the first tracking device 201 as the first spatial relationship information. For example, the first tracking device 201 and the first trackable device 203 can be implemented by an infrared camera and an infrared light emitting diode (LED), respectively. The first trackable device 203 can emit infrared light, and the first tracking device 201 can sense the infrared light emitted by the first trackable device 203, so as to derive the first pose data POS1 by, for example, a perspective-n-point algorithm. Notably, this first pose data POS1 calculated by the first tracking device 201 on the electronic device 10 can indicate six degrees-of-freedom (6-DOF) of the anchor object 13 in relation to the electronic device 10.

It should be understood that the arrangements of the first tracking device 201 and the first trackable device 203 are not limited to that of the embodiments of FIG. 1. In some embodiments, the first tracking device 201 is arranged on the anchor object 13, and the first trackable device 203 is arranged on the electronic device 10. In such arrangements, the first pose data POS1 of the first trackable device 203 in relation to the first tracking device 201 is also calculated as the first spatial relationship information. Furthermore, this first pose data POS1 calculated by the first tracking device 201 on the anchor object 13 can indicate 6-DOF of the electronic device 10 in relation to the anchor object 13.

As can be seen from the descriptions of the above embodiments, in some embodiments, one of the first tracking device 201 and the first trackable device 203 is arranged on the anchor object 13, and the other one of the first tracking device 201 and the first trackable device 203 is arranged on the electronic device 10.

In operation S202, the second tracking equipment 30 obtains second spatial relationship information between the anchor object 13 and the target object 11. In some embodiments, as shown in FIG. 1, the second tracking equipment 30 includes a second tracking device 301 and a second trackable device 303. In particular, the second tracking device 301 is arranged on the anchor object 13, and the second trackable device 303 is arranged on the target object 11. In such arrangements, the second tracking equipment 30 is capable of obtaining the second spatial relationship information between the anchor object 13 and the target object 11.

According to the embodiments of FIG. 1, the second tracking device 301 on the anchor object 13 can interact with the second trackable device 303 on the target object 11, so as to calculate second pose data POS2 of the second trackable device 303 in relation to the second tracking device 301 as the second spatial relationship information. For example, the second tracking device 301 and the second trackable device 303 can be implemented by ultrasound receivers and an ultrasound transmitter, respectively. The second trackable device 303 can emit ultrasound, and the second tracking device 301 can sense the ultrasound emitted by the second trackable device 303, so as to derive the second pose data POS2 with, for example, a three-point method. Notably, this second pose data POS2 calculated by the second tracking device 301 on the anchor object 13 can indicate 6-DOF of the target object 11 in relation to the anchor object 13.

It should be understood that the arrangements of the second tracking device 301 and the second trackable device 303 are not limited to that of the embodiments of FIG. 1. In some embodiments, the second tracking device 301 is arranged on the target object 11, and the second trackable device 303 is arranged on the anchor object 13. In such arrangements, the second pose data POS2 of the second trackable device 303 in relation to the second tracking device 301 is also calculated as the second spatial relationship information. Furthermore, this second pose data POS2 calculated by the second tracking device 301 on the target object 11 can indicate 6-DOF of the anchor object 13 in relation to the target object 11.

As can be seen from the descriptions of the above embodiments, in some embodiments, one of the second tracking device 301 and the second trackable device 303 is arranged on the anchor object 13, and the other one of the second tracking device 301 and the second trackable device 303 is arranged on the target object 11.

In operation S203, the information processor 40 calculates the spatial information of the target object 11 in relation to the electronic device 10 according to the first spatial relationship information and the second spatial relationship information. In some embodiments, the information processor 40 receives the first spatial relationship information and the second spatial relationship information from the first tracking equipment 20 and the second tracking equipment 30, so as to calculate the spatial information of the target object 11 in relation to the electronic device 10.

According to the embodiments of operation S203, in some further embodiments, as shown in FIG. 1, the information processor 40 is communicatively coupled to the first tracking device 201 and the second tracking device 301, and receives the first pose data POS1 (i.e., the first spatial relationship information) and the second pose data POS2 (i.e., the second spatial relationship information) from the first tracking device 201 and the second tracking device 301, respectively. Furthermore, the information processor 40 can pre-store or access fixed pose data POSF from a storage device (not shown), in which the storage device can be implemented by volatile memory, non-volatile memory, or the both. Notably, this fixed pose data POSF indicates fixed 6-DOF of the second tracking device 301 in relation to the first trackable device 203. Accordingly, the information processor 40 can use the first pose data POS1, the second pose data POS2 and the fixed pose data POSF to calculate third pose data POS3 of the target object 11 in relation to the electronic device 10 as the spatial information of the target object 11 in relation to the electronic device 10. This third pose data POS3 can indicate 6-DOF of the target object 11 in relation to the electronic device 10.

As can be seen from the descriptions of the above embodiments, the object tracking method 200 should not be limited to including operations S201-S203. For example, in some embodiments, before operation S201, the object tracking method 200 further includes operation of arranging the first tracking device 201 and the first trackable device 203 on the anchor object 13 and the electronic device 10 respectively or operation of arranging the first tracking device 201 and the first trackable device 203 on the electronic device 10 and the anchor object 13 respectively.

In some embodiments, before operation S201, the object tracking method 200 further includes operation of arranging the second tracking device 301 and the second trackable device 303 on the anchor object 13 and the target object 11 respectively or operation of arranging the second tracking device 301 and the second trackable device 303 on the target object 11 and the anchor object 13 respectively.

In some embodiments, before operation S201, the object tracking method 200 further includes operation of setting the first tracking device 201 and the second tracking device 301 arranged on the anchor object 13 to have fixed spatial relationship information, operation of setting the first tracking device 201 and the second trackable device 303 arranged on the anchor object 13 to have the fixed spatial relationship information, operation of setting the first trackable device 203 and the second tracking device 301 arranged on the anchor object 13 to have the fixed spatial relationship information, or operation of setting the first trackable device 203 and the second trackable device 303 arranged on the anchor object 13 to have the fixed spatial relationship information. For example, in the embodiments of FIG. 1, the second tracking device 301 is set to have the fixed 6-DOF (i.e., the fixed pose data POSF) in relation to the first trackable device 203, in which this fixed 6-DOF of the second tracking device 301 in relation to the first trackable device 203 can be regarded as the fixed spatial relationship information. It can be understood that the first trackable device 203 can be set to have fixed 6-DOF in relation to the second tracking device 301 in some embodiments, so that the fixed 6-DOF of the first trackable device 203 in relation to the second tracking device 301 can be regarded as the fixed spatial relationship information.

In some embodiments, before operation S201, the object tracking method 200 further includes operation of determining the anchor object 13 in the real-world environment where the electronic device 10 and the target object 11 are. In some further embodiments, the anchor object 13 has a fixed position in the real-world environment, which would be further described below with reference to FIG. 3.

Figure 3:
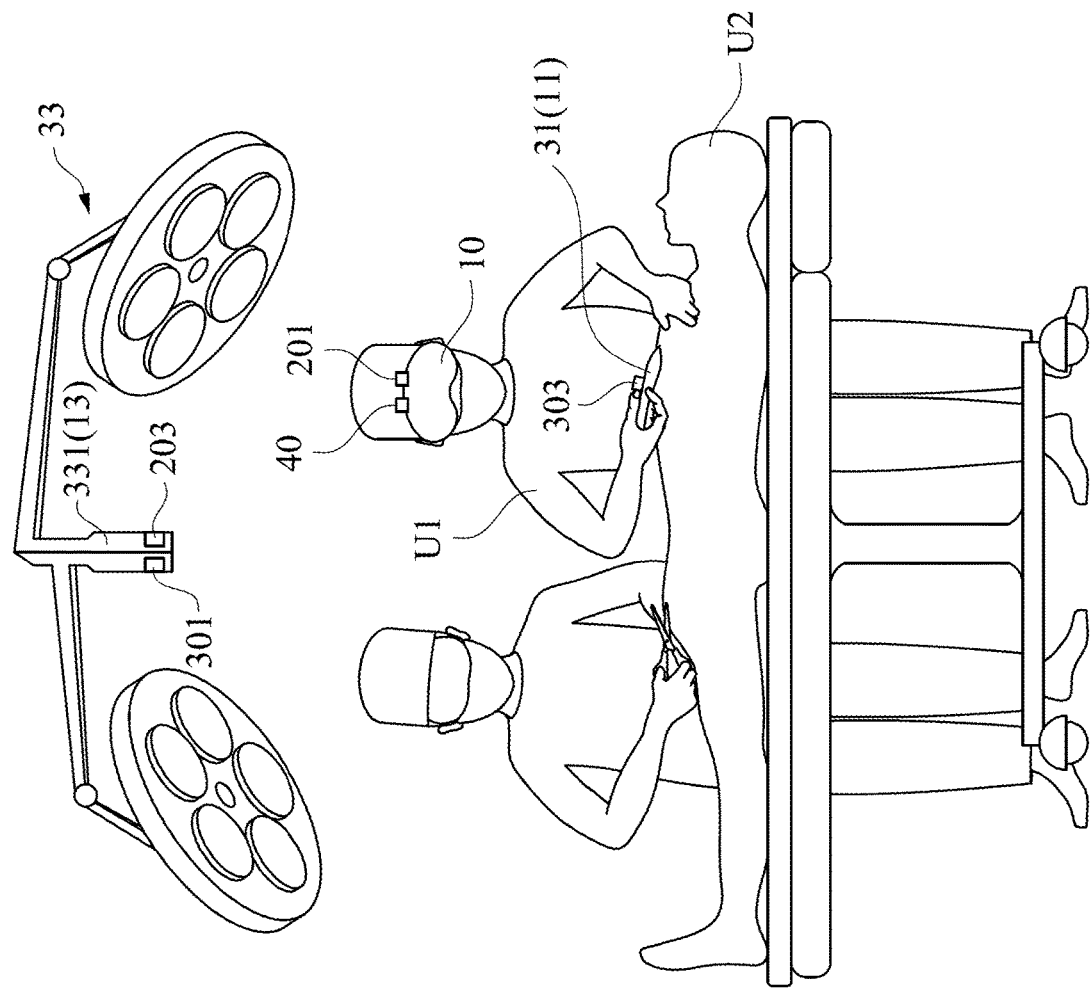
FIG. 3 is a schematic diagram of a scenario that the object tracking system is applied to a medical system in accordance with some embodiments of the present disclosure.

Referring to FIG. 3, FIG. 3 is a schematic diagram of a scenario that the object tracking system 100 is applied to a medical system 300 in accordance with some embodiments of the present disclosure. In some embodiments, the medical system 300 includes a scalpel 31, a surgical lamp 33 and an operating room 35. The medical system 300 is normally used by at least one medical staff (e.g., doctor U1, etc.) to perform medical treatment. For example, in the operating room 35, the doctor U1 performs surgery on a patient U2 with the scalpel 31 under illumination provided by the surgical lamp 33.

When the object tracking system 100 is going to be applied to the medical system 300, the target object 11 which would be tracked by the object tracking system 100 should be determined. Also, the anchor object 13 should be determined too to enhance the ability of the object tracking system 100 to track the target object 11. For example, in the embodiments of FIG. 3, the scalpel 31 is determined to be the target object 11, and a columnar part 331 of the surgical lamp 33 which is fixed in the operating room 35 (i.e., having the fixed position in the real-world environment) is determined to be the anchor object 13. Furthermore, in the embodiments of FIG. 3, the electronic device 10 is a head-mounted device (HMD), and is mounted on head of the doctor U1 for informing the doctor U1 of the spatial information of the scalpel 31 (i.e., the target object 11) in relation to the electronic device 10.

In the embodiments of FIG. 3, the arrangements of the first tracking equipment 20 and the second tracking equipment 30 are the same as that of the embodiments of FIG. 1. That is to say, the first tracking device 201 is arranged on the electronic device 10, the first trackable device 203 and the second tracking device 301 both are arranged on the columnar part 331 (i.e., the anchor object 13), and the second trackable device 303 is arranged on the scalpel 31 (i.e., the target object 11). In addition, the information processor 40 is arranged on the electronic device 10 and can transmit calculation result (e.g., the spatial information) to the electronic device 10. The calculation of the spatial information of the scalpel 31 in relation to the electronic device 10 are similar to the descriptions of the embodiments of FIGS. 1 and 2, and therefore are omitted herein.

In some further embodiments, as shown in FIG. 1, the electronic device 10 includes a display 101. The electronic device 10 can be communicatively coupled to the information processor 40 via at least one communicator (not shown) in the electronic device 10, so that at least one controller/processor (not shown) in the electronic device 10 receive the spatial information (e.g., the third pose data POS3) of the target object 11 in relation to the electronic device 10. Then, the controller/processor in the electronic device 10 can utilize the display 101 to provide an immersive content CI showing the spatial information of the scalpel 31 (i.e., target object 11) in relation to the electronic device 10 to, for example, the doctor U1 in FIG. 3.

According to the above embodiments that the electronic device 10 provides the immersive content CI to the doctor U1 via the display 101, the immersive content CI can be an augmented reality (AR) environment. In particular, the AR environment can augment the real-world environment (i.e., the operating room 35) directly seen by the doctor U1 with virtual reality objects (which cannot be directly seen in the real-world environment by the doctor U1), which would be further described below with reference to FIG. 4.

Figure 4:
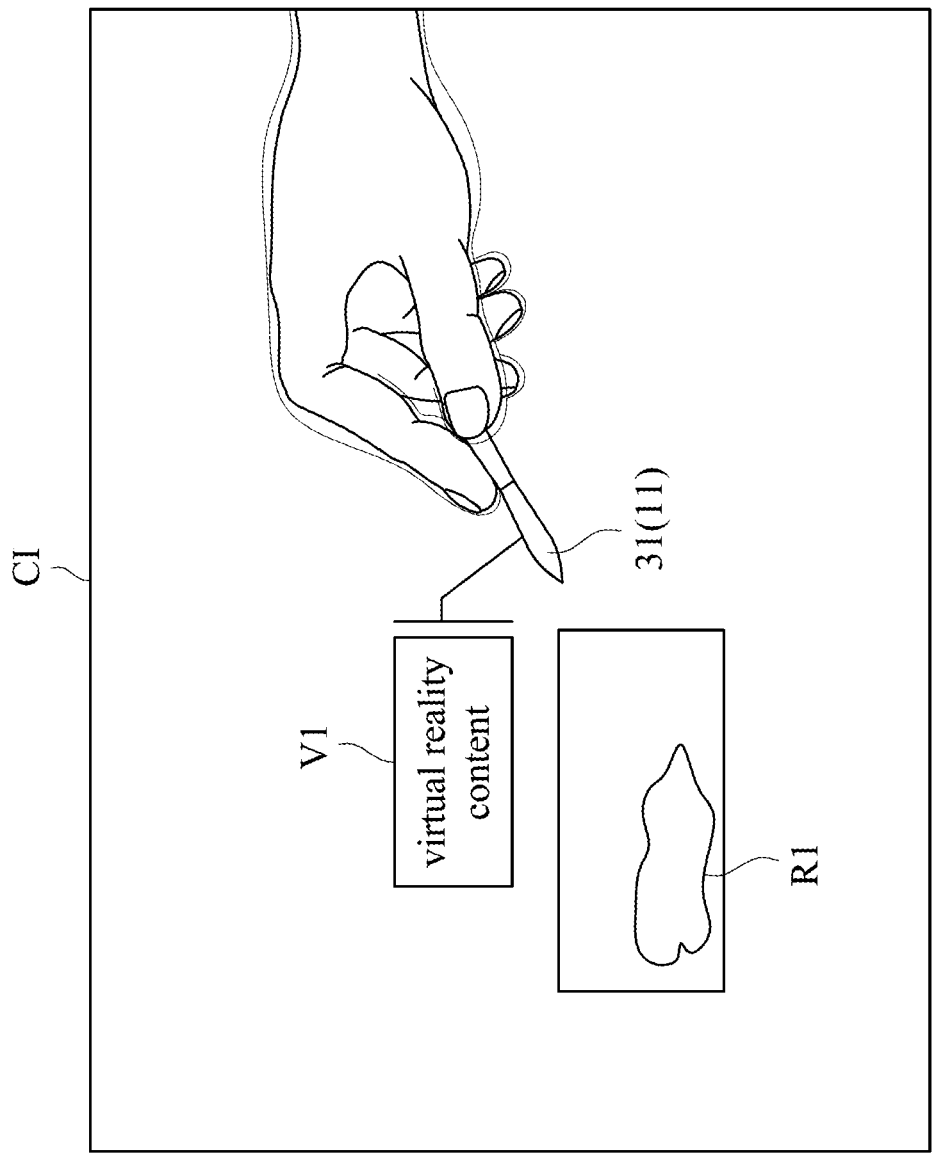
FIG. 4 is a schematic diagram of an immersive content in accordance with some embodiments of the present disclosure.

Referring to FIG. 4, FIG. 4 is a schematic diagram of the immersive content CI in accordance with some embodiments of the present disclosure. In the embodiments of FIG. 4, the immersive content CI provided by the electronic device 10 worn by the doctor U1 shows the scalpel 31, a lesion R1 (or wound, incision, etc.) on the patient U2 and one virtual reality content V1 (i.e., the virtual reality object). It can be understood that the direct visibility of the doctor U1 to the scalpel 31 may possibly be occluded during the surgery by, for example body fluid (e.g., blood), organ, etc. Notably, the virtual reality content V1 can indicate the spatial information of the scalpel 31 in relation to the electronic device 10 in a known way. In such way, even if the direct visibility of the doctor U1 to the scalpel 31 is occluded, the doctor U1 can be well aware of the position of the scalpel 31 through the virtual reality content V1 in the immersive content CI.

In the embodiments of FIGS. 3 and 4, the immersive content CI provided by the electronic device 10 is the AR environment, but the present disclosure is not limited thereto. In some embodiments, the immersive content CI can be a virtual reality (VR) environment, or a mixed reality (MR) environment. In particular, the MR environment simulates the real-world environment and enables an interaction of the virtual reality objects with a simulated environment. In addition, according to the embodiments that the electronic device 10 is the HMD, the doctor U1 of the electronic device 10 may control the virtual reality objects (e.g., the virtual reality content V1) in the immersive content CI by operating at least one controller (not shown) or by making hand or eye movements. In particular, the at least one controller is wirelessly connected to the electronic device 10, and the hand or eye movements would be sensed and recognized by the electronic device 10 via at least one camera (not shown).

According to the embodiments that the first tracking device 201 is implemented by the infrared camera, in some further embodiments, the first tracking device 201 arranged on the electronic device 10 has a field of view (FOV) being aligned with the first trackable device 203 arranged on the anchor object 13. In such arrangements, it is ensured that the first tracking device 201 can track the first trackable device 203.

In the above embodiments, as shown in FIG. 3, a rigid object (i.e., the columnar part 331 of the surgical lamp 33) in the real-world environment is determined to be the anchor object 13, but the present disclosure is not limited thereto. For example, in some embodiments, a movable object in the real-world environment is determined to be the anchor object 13, which would be further described below with reference to FIG. 5.

Figure 5:
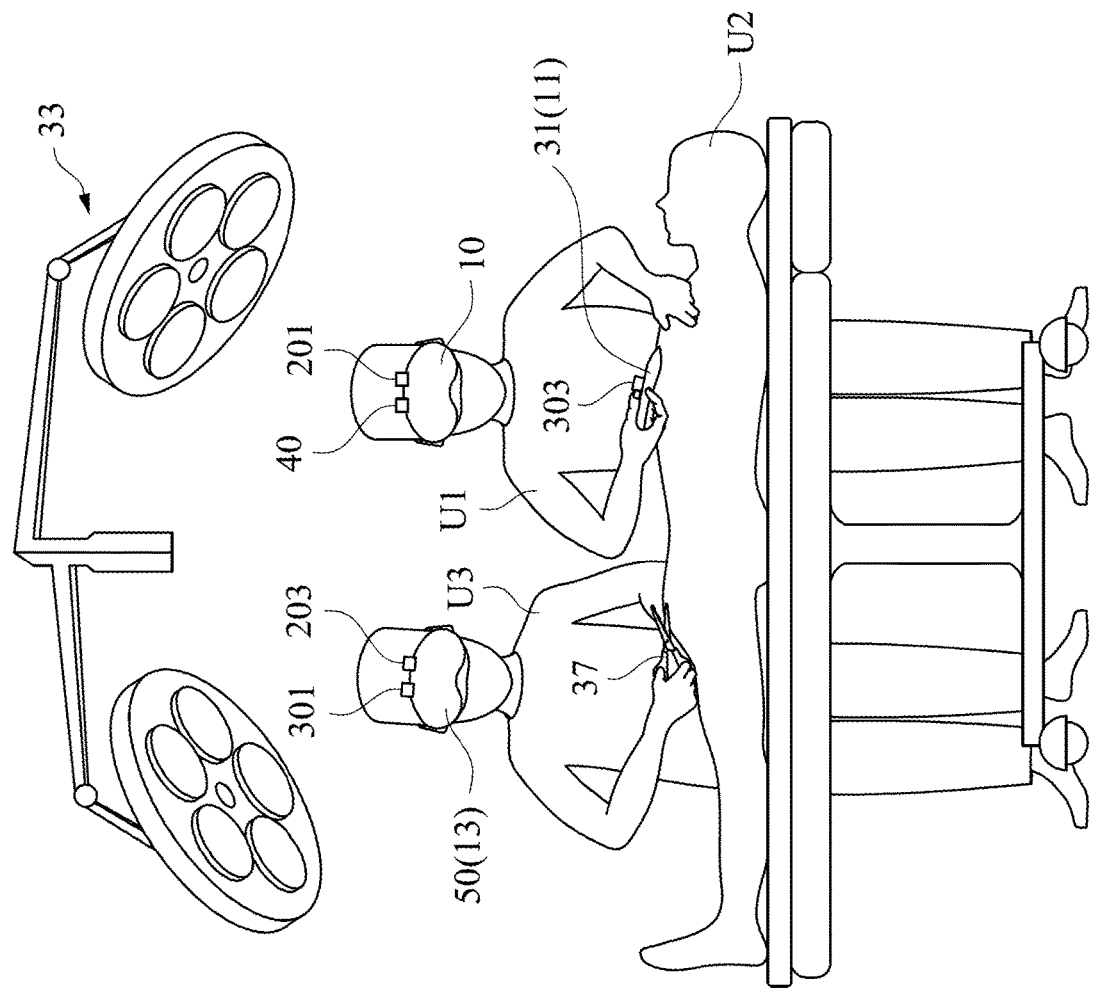
FIG. 5 is a schematic diagram of another scenario that the object tracking system is applied to the medical system in accordance with some embodiments of the present disclosure.

Referring to FIG. 5, FIG. 5 is a schematic diagram of another scenario that the object tracking system 100 is applied to the medical system 300 in accordance with some embodiments of the present disclosure. As shown in FIG. 5, another electronic device 50 (e.g., another HMD) mounted on head of another doctor U3 is determined to be the anchor object 13, and the first trackable device 203 and the second tracking device 301 both are arranged on the electronic device 50. Thus, the anchor object 13 in these embodiments is movable in the real-world environment (e.g., the operating room 35).

In addition, the electronic device 10 and the electronic device 50 each is capable of locate itself in the real-world environment by some visual-based localization technologies (e.g., Simultaneous Localization and Mapping (SLAM), etc.), which may help the object tracking system 100 to track the target object 11. For example, the electronic device 10 can obtain its pose in a map of the real-world environment by the visual-based localization technologies, and the electronic device 50 can obtain its pose in another map of the real-world environment by the visual-based localization technologies. Also, the electronic device 10 and the electronic device 50 can share data (e.g., the map established by the electronic device 10, the map established by the electronic device 50, the pose of the electronic device 10, the pose of the electronic device 50, etc.) with the information processor 40. By the data shared by the electronic device 10 and the electronic device 50, the information processor 40 may obtain or calculate another spatial relationship information between the electronic device 10 and the electronic device 50 (e.g., pose data of the electronic device 50 in relation to the electronic device 10, pose data of the electronic device 10 in relation to the electronic device 50, etc). When the first tracking equipment 20 is accidentally unable to obtain the first spatial relationship information between the electronic device 10 and the anchor object 13 (i.e., the electronic device 50), the information processor 40 may use the another spatial relationship information between the electronic device 10 and the electronic device 50 (which is obtained according to the data generated by the visual-based localization technologies) and the second spatial relationship information between the anchor object 13 and the target object 11 to calculate the spatial information of the target object 11 in relation to the electronic device 10.

Figure 6:
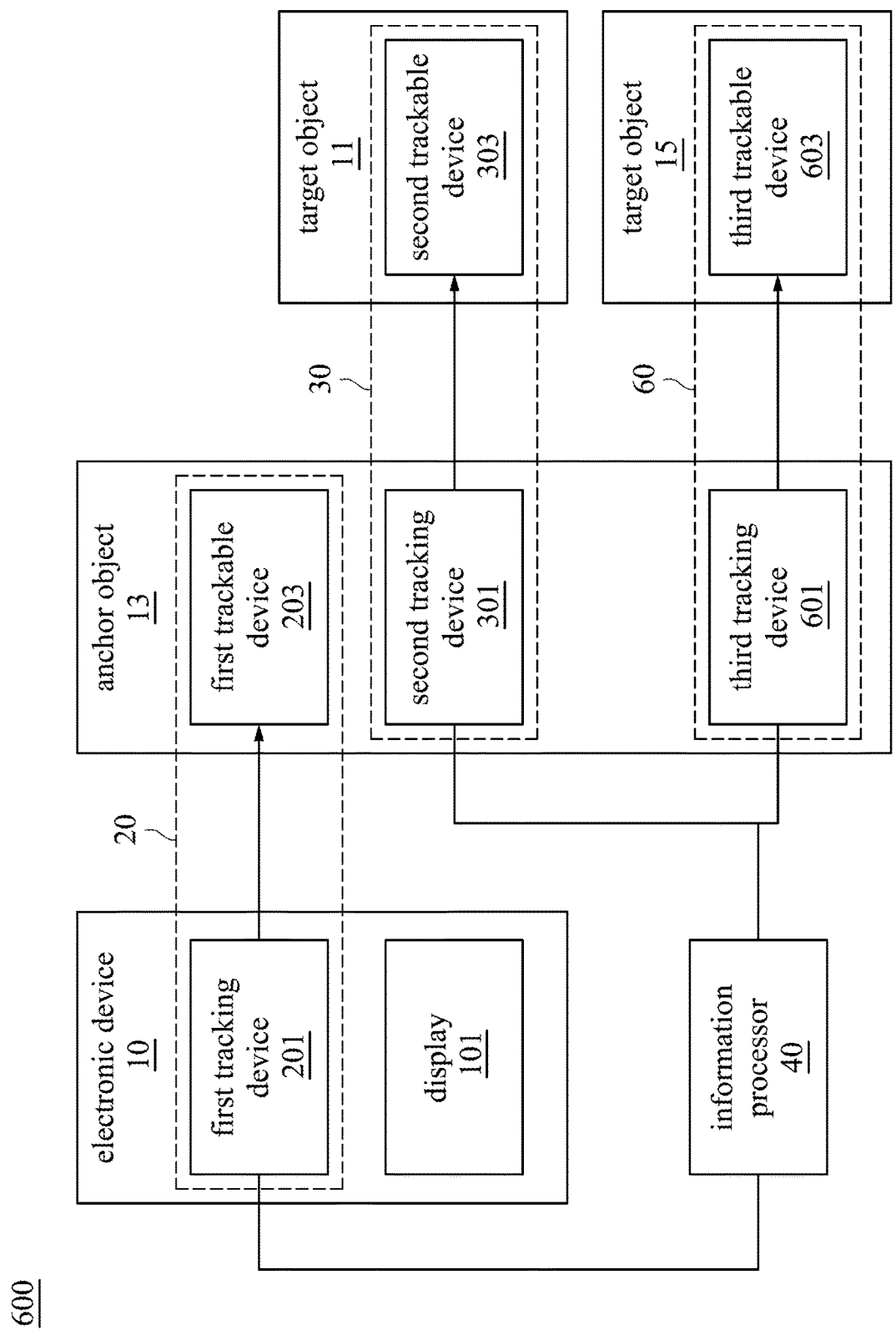
FIG. 6 is a block diagram of another object tracking system in accordance with some embodiments of the present disclosure.

As can be understood, the object tracking system of the present disclosure is not limited to tracking the target object 11 only. For example, referring to FIG. 6, FIG. 6 is a block diagram of another object tracking system 600 in accordance with some embodiments of the present disclosure. In the embodiments of FIG. 6, the object tracking system 600 is configured to track the target object 11 and another target object 15. For example, the target object 15 can be a forceps 37 of the medical system 300 hold by the doctor U3 in FIG. 5. In order to track both the target object 11 and the target object 15, the object tracking system 600 includes the electronic device 10, the first tracking equipment 20, the second tracking equipment 30, the information processor 40 and a third tracking equipment 60.

In some embodiments, the third tracking equipment 60 is configured to obtain third spatial relationship information between the anchor object 13 and the target object 15. In particular, the third tracking equipment 60 includes a third tracking device 601 and a third trackable device 603, the third tracking device 601 is arranged on the anchor object 13, and the third trackable device 603 is arranged on the target object 15. The third tracking device 601 on the anchor object 13 can interact with the third trackable device 603 on the target object 15, so as to calculate pose data (not shown) of the third trackable device 603 in relation to the third tracking device 601 as the third spatial relationship information. For example, the third tracking device 601 and the third trackable device 603 can be implemented by an electromagnetic (EM) field generator and an EM sensor, respectively. Notably, this pose data calculated by the third tracking device 601 on the anchor object 13 can indicate 6-DOF of the target object 15 in relation to the anchor object 13.

Furthermore, the information processor 40 in FIG. 6 can calculate spatial information of the target object 15 in relation to the electronic device 10 according to the first spatial relationship information obtained by the first tracking equipment 20 and the third spatial relationship information obtained by the third tracking equipment 60. In particular, in the embodiments of FIG. 6, the third tracking device 601 is set to have fixed 6-DOF in relation to the first trackable device 203. The information processor 40 calculates pose data (not shown) of the target object 15 in relation to the electronic device 10 as the spatial information of the target object 15 in relation to the electronic device 10 according to the first pose data POS1, the pose data calculated by the third tracking device 601 on the anchor object 13 and fixed pose data indicating the fixed 6-DOF of the third tracking device 601 in relation to the first trackable device 203. The operations of the first tracking equipment 20 and the second tracking equipment 30 in FIG. 6 are the same as that of the embodiments of FIG. 1, and therefore are omitted herein.

It should be understood that the spatial information of the target object 15 in relation to the electronic device 10 can be shown in the immersive content CI together with the spatial information of the target object 11 in relation to the electronic device 10.

Also, it should be understood that the arrangements of the third tracking device 601 and the third trackable device 603 are not limited to that of the embodiments of FIG. 6. In some embodiments, the third tracking device 601 is arranged on the target object 15, and the third trackable device 603 is arranged on the anchor object 13. In such arrangements, pose data indicating 6-DOF of the anchor object 13 in relation to the target object 15 is calculated as the third spatial relationship information.

As can be seen from the descriptions of the first tracking equipment 20, the second tracking equipment 30 and the third tracking equipment 60, the first tracking equipment 20, the second tracking equipment 30 and the third tracking equipment 60 can be implemented by three different tracking technologies, respectively. However, the present disclosure is not limited thereto. In some embodiments, the first tracking equipment 20, the second tracking equipment 30 and the third tracking equipment 60 can be implemented by the same tracking technology or by three tracking technologies that are partly the same and partly different. In the above embodiments, the tracking technologies include infrared, electromagnetic field, video/image, ultrasound, LIDAR, sonar, structured light, time of flight (ToF) system, etc. Because the object tracking system 100 offers a great degree of flexibility in the tracking technologies among the electronic device 10, the anchor object 13 and the target object 11, it is convenient to apply the object tracking system 100 in a variety of situations. For example, the user of the object tracking system 100 may choose one tracking technology suitable for the type of the target object 11 (e.g., the scalpel 31), and may choose another tracking technology different from said one tracking technology used between the anchor object 13 and the target object 11 for the electronic device 10. If said another tracking technology has advantage of low cost, the cost for applying the object tracking system 100 may be reduced.

As can be understood, the object tracking system of the present disclosure is not limited to tracking the target object 11 based on the anchor object 13 only. For example, in some embodiments, the number of the anchor object 13 can be greater than 1.

In the above embodiments, the information processor 40 can be implemented by central processing unit (CPU), application-specific integrated circuit (ASIC), microprocessor, system on a Chip (SoC) or other suitable processing circuits. Furthermore, the information processor 40 can be independent device, or can be integrated into the electronic device 10 and/or the anchor object 13.

In some further embodiments, each of the tracking equipment (e.g., the first tracking equipment 20, the second tracking equipment 30 and the third tracking equipment 60) in the object tracking system of the present disclosure can be paired with at least one inertial measurement unit (IMU), to increase the degree of precision of the spatial relationship information between any two of the electronic device 10, at least one anchor object 13 and at least one target object 11.

Also, in some further embodiments, the lesion R1 can be marked and tracked with a variety of known medical technologies (e.g., contrast agents, X-ray, etc.) by the medical system 300. 6-DOF of the lesion R1 in relation to an origin (not shown) defined by the medical system 300 can be provided to the information processor 40. In such arrangements, the information processor 40 can convert the 6-DOF of the lesion R1 into spatial information of the lesion R1 in relation to the electronic device 10 in a known way. In addition, the immersive content CI provided by the electronic device 10 can indicate the spatial information of at least one target object 11 and the spatial information of the lesion R1. In such way, the doctor U1 wearing the electronic device 10 would not have to see other monitors in the operating room 35 during the surgery, and thus the surgery efficiency is increased to reduce the fatigue of the doctor U1.

As can be seen from the above embodiments of the present disclosure, by obtaining the first spatial relationship information between the electronic device 10 and the anchor object 13 and the second spatial relationship information between the anchor object 13 and the target object 11, the object tracking system and method of the present disclosure can calculate the spatial information of the target object 11 in relation to the electronic device 10 in real-time, even if the target object 11 is occluded. In other words, the object tracking system and method of the present disclosure has advantage of wider field of view for tracking, etc.

Furthermore, in some practical applications, by using the ultrasound tracking technology (e.g., the second tracking equipment) to obtain the second spatial relationship information between the anchor object 13 and the target object 11, the object tracking system and method of the present disclosure may avoid the problems of the optical tracker (e.g., the infrared LED, the optical code, etc.) being occluded or dirtied.

The disclosed methods, may take the form of a program code (i.e., executable instructions) embodied in tangible media, such as floppy diskettes, CD-ROMS, hard drives, or any other transitory or non-transitory machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. An object tracking method, applicable to an object tracking system configured to track a target object, and comprising:

by a first tracking equipment, obtaining first spatial relationship information between an electronic device and an anchor object, wherein the first tracking equipment comprises a first tracking device and a first trackable device, one of the first tracking device and the first trackable device is disposed on the electronic device, and the other one of the first tracking device and the first trackable device is disposed on the anchor object;

by a second tracking equipment, obtaining second spatial relationship information between the anchor object and the target object, wherein the second tracking equipment comprises a second tracking device and a second trackable device, one of the second tracking device and the second trackable device is disposed on the anchor object, and the other one of the second tracking device and the second trackable device is disposed on the target object; and by an information processor, calculating spatial information of the target object in relation to the electronic device according to the first spatial relationship information and the second spatial relationship information.

2. The object tracking method of claim 1, wherein the object tracking method further comprises:
arranging the first tracking device and the first trackable device on the anchor object and the electronic device, respectively; or
arranging the first tracking device and the first trackable device on the electronic device and the anchor object, respectively.

3. The object tracking method of claim 2, wherein by the first tracking equipment, obtaining the first spatial relationship information between the electronic device and the anchor object comprises:
by the first tracking device, calculating first pose data of the first trackable device in relation to the first tracking device by interacting with the first trackable device, wherein the first spatial relationship information comprises the first pose data.

4. The object tracking method of claim 2, wherein the object tracking method further comprises:
arranging the second tracking device and the second trackable device on the anchor object and the target object, respectively; or
arranging the second tracking device and the second trackable device on the target object and the anchor object, respectively.

5. The object tracking method of claim 4, wherein by the second tracking equipment, obtaining the second spatial relationship information between the anchor object and the target object comprises:
by the second tracking device, calculating second pose data of the second trackable device in relation to the second tracking device by interacting with the second trackable device, wherein the second spatial relationship information comprises the second pose data.

6. The object tracking method of claim 4, further comprising:
setting the first tracking device and the second tracking device arranged on the anchor object to have fixed spatial relationship information;
setting the first tracking device and the second trackable device arranged on the anchor object to have the fixed spatial relationship information;
setting the first trackable device and the second tracking device arranged on the anchor object to have the fixed spatial relationship information; or
setting the first trackable device and the second trackable device arranged on the anchor object to have the fixed spatial relationship information.

7. The object tracking method of claim 4, wherein by the information processor, calculating the spatial information of the target object in relation to the electronic device according to the first spatial relationship information and the second spatial relationship information comprises:
calculating third pose data of the target object in relation to the electronic device according to first pose data of the first trackable device in relation to the first tracking device, second pose data of the second trackable device in relation to the second tracking device and fixed pose data, wherein the second tracking device is set to have the fixed pose data in relation to the first tracking device or the first trackable device, or the second trackable device is set to have the first pose data in relation to the first tracking device or the first trackable device.

8. The object tracking method of claim 1, further comprising:
determining the anchor object in a real-world environment where the electronic device and the target object are, wherein the anchor object has a fixed position in the real-world environment.

9. The object tracking method of claim 8, wherein the electronic device comprises a display, and the object tracking method further comprises:
by the electronic device, providing an immersive content comprising a virtual reality content indicating the spatial information via the display.

10. An object tracking system configured to track a target object, and comprising:
an electronic device;
a first tracking equipment, configured to obtain first spatial relationship information between the electronic device and an anchor object, and comprising a first tracking device and a first trackable device, wherein one of the first tracking device and the first trackable device is disposed on the electronic device, and the other one of the first tracking device and the first trackable device is disposed on the anchor object;
a second tracking equipment, configured to obtain second spatial relationship information between the anchor object and the target object, and comprising a second tracking device and a second trackable device, wherein one of the second tracking device and the second trackable device is disposed on the anchor object, and the other one of the second tracking device and the second trackable device is disposed on the target object; and
an information processor, configured to calculate spatial information of the target object in relation to the electronic device according to the first spatial relationship information and the second spatial relationship information.

11. The object tracking system of claim 10, wherein the first tracking device and the first trackable device are arranged on the anchor object and the electronic device, or the first tracking device and the first trackable device are arranged on the electronic device and the anchor object.

12. The object tracking system of claim 11, wherein the first tracking device is configured to calculate first pose data of the first trackable device in relation to the first tracking device by interacting with the first trackable device, wherein the first spatial relationship information comprises the first pose data.

13. The object tracking system of claim 11, wherein the second tracking device and the second trackable device are arranged on the anchor object and the target object, or the second tracking device and the second trackable device are arranged on the target object and the anchor object.

14. The object tracking system of claim 13, wherein the second tracking device is configured to calculate second pose data of the second trackable device in relation to the second tracking device by interacting with the second trackable device, wherein the second spatial relationship information comprises the second pose data.

15. The object tracking system of claim 13, wherein the first tracking device and the second tracking device arranged on the anchor object are set to have fixed spatial relationship information;
   the first tracking device and the second trackable device arranged on the anchor object are set to have the fixed spatial relationship information;
   the first trackable device and the second tracking device arranged on the anchor object are set to have the fixed spatial relationship information; or
   the first trackable device and the second trackable device arranged on the anchor object are set to have the fixed spatial relationship information.

16. The object tracking system of claim 13, wherein the information processor is configured to calculate third pose data of the target object in relation to the electronic device according to first pose data of the first trackable device in relation to the first tracking device, second pose data of the second trackable device in relation to the second tracking device and fixed pose data, wherein the second tracking device is set to have the fixed pose data in relation to the first tracking device or the first trackable device, or the second trackable device is set to have the first pose data in relation to the first tracking device or the first trackable device.

17. The object tracking system of claim 10, wherein a rigid object in a real-world environment where the electronic device and the target object are is determined to be the anchor object, and the anchor object has a fixed position in the real-world environment.

18. The object tracking system of claim 17, wherein the electronic device comprises a display, and is configured to provide an immersive content comprising a virtual reality content indicating the spatial information via the display.

19. The object tracking system of claim 10, wherein another electronic device in a real-world environment where the electronic device and the target object are is determined to be the anchor object, and the another electronic device is movable in the real-world environment and is configured to locate itself in the real-world environment.

20. A non-transitory computer readable storage medium with a computer program to execute an object tracking method applicable to an object tracking system configured to track a target object, wherein the object tracking method comprises:
   by a first tracking equipment, obtaining first spatial relationship information between an electronic device and an anchor object, wherein the first tracking equipment comprises a first tracking device and a first trackable device, one of the first tracking device and the first trackable device is disposed on the electronic device, and the other one of the first tracking device and the first trackable device is disposed on the anchor object;
   by a second tracking equipment, obtaining second spatial relationship information between the anchor object and the target object, wherein the second tracking equipment comprises a second tracking device and a second trackable device, one of the second tracking device and the second trackable device is disposed on the anchor object, and the other one of the second tracking device and the second trackable device is disposed on the target object; and
   by an information processor, calculating spatial information of the target object in relation to the electronic device according to the first spatial relationship information and the second spatial relationship information.

\* \* \* \* \*